United States Patent [19] [11] E Patent Number: Re. 32,269
Bisk et al. [45] Reissued Date of Patent: Oct. 28, 1986

[54] PLASTIC CLIP

[75] Inventors: Leonard Bisk, Elkins Park; Gunther Rogahn, Lansdale, both of Pa.

[73] Assignee: Independent Products Company, Inc., West Point, Pa.

[21] Appl. No.: 587,343

[22] Filed: Mar. 8, 1984

Related U.S. Patent Documents

Reissue of:
[64] Patent No.: 4,335,838
Issued: Jun. 22, 1982
Appl. No.: 137,930
Filed: Apr. 7, 1980

[51] Int. Cl.[4] ..... A47J 51/095; A47J 51/14; D06F 55/02

[52] U.S. Cl. ..... 223/91; 24/501; 24/511; 24/562; 24/564; 223/93; 223/96

[58] Field of Search ..... 24/137 A, 346, 489, 24/499, 501, 507, 508, 511, 530, 536, 562, 564; 223/91, 93, 96, 85, DIG. 4; 211/115; 248/341; D6/253, 254

[56] References Cited

U.S. PATENT DOCUMENTS

| | | | |
|---|---|---|---|
| 1,151,556 | 8/1915 | Barney | 24/564 X |
| 1,684,721 | 9/1928 | Wood | 24/501 |
| 2,496,109 | 1/1950 | Terry | 24/530 |
| 2,583,784 | 1/1952 | Maccaferri | 223/91 |
| 2,666,240 | 1/1954 | Maccaferri | 24/501 |
| 2,723,786 | 11/1955 | Martin | 223/91 |
| 3,227,334 | 1/1966 | Samuelsson . | |
| 3,239,902 | 3/1966 | Cohen | 223/91 X |
| 3,456,262 | 7/1969 | Coon | 24/501 |
| 3,963,154 | 6/1976 | Schwartz et al. . | |
| 4,009,807 | 3/1977 | Coon | 223/96 |
| 4,074,838 | 2/1978 | Blasnik et al. . | |

FOREIGN PATENT DOCUMENTS

| | | | |
|---|---|---|---|
| 1159796 | 2/1958 | France | 24/511 |
| 1210426 | 9/1959 | France | 223/96 |
| 348684 | 8/1937 | Italy | 24/564 |
| 7306492 | 11/1974 | Netherlands | 24/562 |
| 243567 | 1/1947 | Switzerland | 223/91 |
| 278907 | 2/1952 | Switzerland | 24/508 |
| 352309 | 4/1961 | Switzerland | 24/501 |
| 302326 | 1/1928 | United Kingdom . | |
| 477118 | 12/1937 | United Kingdom . | |
| 576423 | 4/1946 | United Kingdom . | |
| 593125 | 10/1947 | United Kingdom . | |
| 624783 | 6/1949 | United Kingdom . | |
| 697866 | 9/1953 | United Kingdom . | |
| 714990 | 9/1954 | United Kingdom . | |
| 715188 | 9/1954 | United Kingdom | 223/91 |
| 731906 | 6/1955 | United Kingdom . | |
| 916481 | 1/1963 | United Kingdom . | |
| 925386 | 5/1963 | United Kingdom . | |
| 1360965 | 7/1974 | United Kingdom . | |

*Primary Examiner*—Robert R. Mackey
*Attorney, Agent, or Firm*—Caesar, Rivise, Bernstein & Cohen

[57] ABSTRACT

A molded plastic hanger and a clip for use therewith or with other members. The hanger includes a body portion having a diverging pair of arms including slots therein and a crossbar for mounting garment holding clips. A plastic swivel hook is connected to the body portion at a stem. The stem includes a shaft having an annular locking recess in its periphery which is adapted to be received within a mating socket of the hook to connect the hook and body portion to each other while enabling them to be swiveled readily with respect to each other. The clip is arranged for securement to the crossbar of the hanger or to any other rod-like element and is formed of a three piece construction comprising a pair of plastic jaws and a resilient U-shaped member, also formed of plastic, but having a higher tensile strength and resiliency than the plastic of the jaws.

8 Claims, 5 Drawing Figures

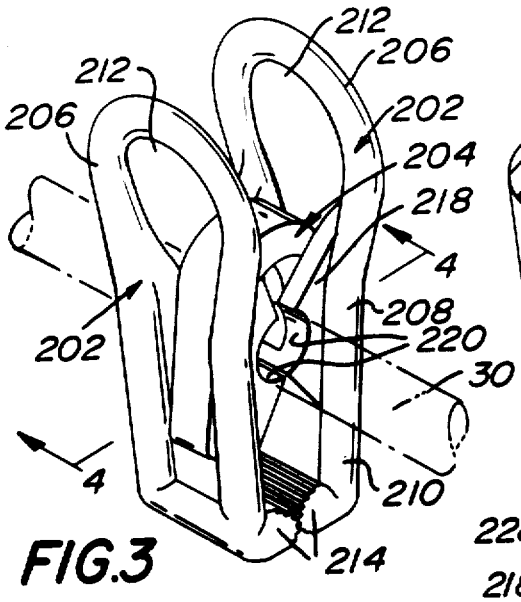
FIG.3
FIG.4
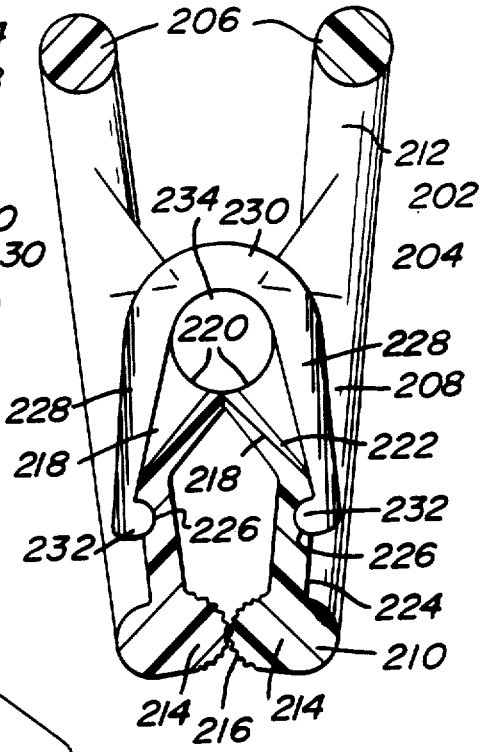
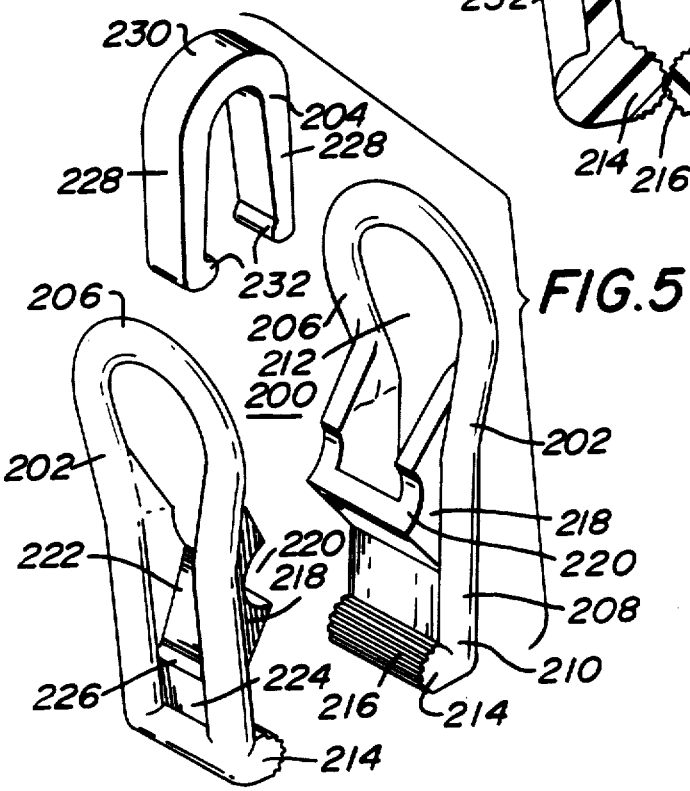
FIG.5

PLASTIC CLIP

Matter enclosed in heavy brackets [ ] appears in the original patent but forms no part of this reissue specification; matter printed in italics indicates the additions made by reissue.

This invention relates generally to garment hangers and particularly to molded plastic hangers and clips for use thereon, as well as for other uses.

Commercially available hangers are frequently fabricated of plastic material since such hangers can be made relatively inexpensively as compared to wooden hangers, yet are substantially more durable than wire hangers.

Conventional commercially available plastic hangers commonly comprise a plastic body portion and a metal hook. The hook may be pivotally secured to the body to enable the body to swivel with respect to the hook. Examples of hanger structures including a plastic body and a metal suspending hook are found in the U.S. Pat. Nos. 3,406,883 (Crane), 3,282,481 (Maxwell), and 3,407,979 (Patch). All-plastic garment hangers are also commercially available and many have been disclosed in the patent literature. For example, the following United States patents disclose hangers entirely formed of a plastic material: 3,067,917 (Reller, et al.), 3,116,860 (Urich), 3,209,966 (Wach), 3,463,369 (Moskowitz), 3,570,729 (Zuckerman), 3,897,893 (Lemmenes), 3,963,154 (Schwartz, et al), 3,973,705 (Erthein), 4,040,546 (Liebscher), and 4,074,838 (Blasnik, et al). Among the aforementioned patents, the patents to Schwartz, et al, Liebscher and Blasnik, et al, each disclose all-plastic hangers having swivel hooks.

Conventional garment hangers also frequently include pinch-type jaw clips arranged to be located at various positions along a cross-bar to hold trousers or skirts on the hanger. Examples of such hangers are found in U.S. Pat. Nos. 2,378,578 (Oskow), 2,496,531 (Gray), 2,546,717 (Beetlestone, et al), 2,617,568 (Pechtel), and 3,950,829 (Cohen).

While the aforeidentified plastic hangers do achieve various design goals, such hangers nevertheless suffer from one or more drawbacks, such as complexity of construction, difficulty of assembly, limited utility, limited durability and ruggedness.

Accordingly, it is a general object of the instant invention to provide an entirely plastic hanger and an entirely plastic clip, each of which can be used independently of one another and which overcomes the disadvantages of the prior art.

It is a further object of the instant invention to provide an entirely plastic hanger having a freely swivelable suspender hook.

It is still a further object of this invention to provide an entirely plastic hanger which is low in cost and can be readily assembled.

It is still a further object of this invention to provide an entirely plastic hanger having the capability of holding various types of garments.

It is still a further object of the instant invention to provide an entirely plastic hanger having wide utility and constructed to have an aesthetically pleasing, modern, tubular appearance.

It is still a further object of the instant invention to provide an entirely plastic clip which can be used with said hanger, with conventional hangers or on any rod-like element and which overcomes the disadvantages of the prior art.

It is still a further object of the instant invention to provide an entirely plastic clip which is low in cost and can be readily assembled.

These and other objects of the instant invention are achieved by providing an all-plastic hanger with a swivel hook and all-plastic clips with both the hanger and the clips being usable independently of the other. The hanger includes an integral body portion and hook means connected thereto for supporting the body portion. The body portion includes a neck portion, a pair of arms diverging outwardly therefrom and a cross-bar portion interconnecting the outer ends of the arms.

The body portion and the hook means are each substantially cylindrical in cross-section along their entire length. The hook means includes an arcuate upper portion and a connecting portion. The connecting portion includes a cylindrical socket having a longitudinal axis. The neck portion includes a cylindrical shaft disposed and locked within said socket for swiveling about the longitudinal axis. The socket includes a peripheral collar projecting radially inward and about the longitudinal axis and the shaft includes a mating annular recess for receipt of the collar to lock the shaft within the socket and enable the body portion and hook means to be swiveled with respect to each other.

The clip is arranged for ready assembly and releasable securement to the cross-bar of the hanger or to any other rod-like element having a longitudinal axis. The clip comprises a pair of jaws formed of a first plastic material and resilient bias means formed of a second plastic material. The second material has a higher tensile strength than the first material. Each of the jaws is a generally planar member comprising an enlarged first end portion defining a finger grasping opening, an intermediate portion, and a second end portion including a projection extending normally to the plane of the jaw member. The intermediate portion includes an arcuate recess for receipt of a portion of the periphery of the cross-bar or other rod-like element. The bias means is a generally U-shaped member having a pair of outwardly flared legs, each of which is arranged to engage a respective one of the jaws to hold the jaws on the cross-bar or rod-like element so that the clips can be readily slid therealong and pivoted thereabout.

Other objects and many of the attendant advantages of the instant invention will be readily appreciated as the same becomes better understood by reference to the following detailed description when considered in connection with the accompanying drawing wherein:

FIG. 3 is a perspective view of the clip of the instant invention shown mounted on a rod-like element, such as a portion of the hanger shown in FIG. 1;

FIG. 4 is an enlarged sectional view taken along line 4—4 of FIG. 3; and

FIG. 5 is an exploded perspective view of the clip.

Figure 2:
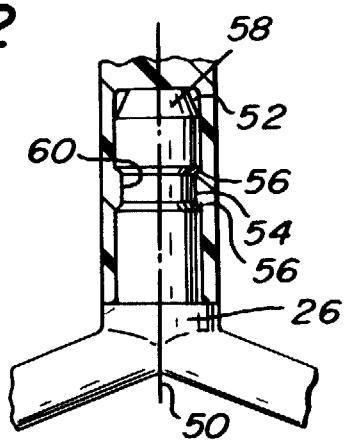
FIG. 2 is an enlarged view, partially in section, showing a portion of the hanger within the area 2 shown in FIG. 1.

Referring now in greater detail to the various figures of the drawing wherein like reference characters refer to like parts, there is shown at 20 a hanger constructed in accordance with one aspect of the instant invention and a clip 200 constructed in accordance with another aspect of the instant invention.

Figure 1:
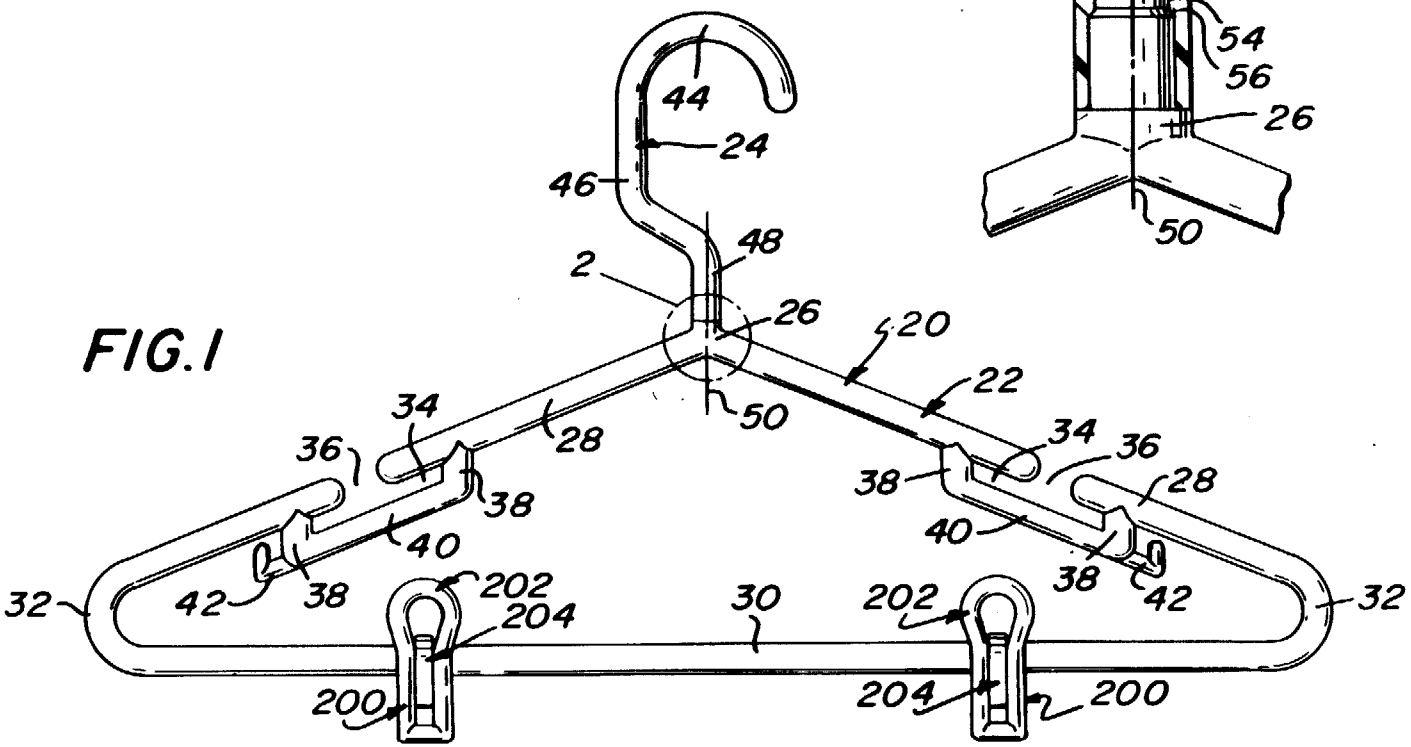
FIG. 1 is a plan view of an all-plastic hanger constructed in accordance with one aspect of the instant invention and including an all-plastic clip constructed in accordance with another aspect of the instant invention and mounted on the hanger.

It must be pointed out at this juncture that while the clip 200 is shown mounted on the hanger 20 in FIG. 1, either the hanger 20 or the clip 200 can be used independently of one another. To that end, the hanger 20 may be used without any clip thereon, may be used with suitably constructed prior art clips, or may be used with the clip 200. The clip 200 may be used with the hanger of this invention, with prior art garment hangers, or with any structural body having a rod-like element or portion on which it is desired to position a clip for longitudinal movement therealong and swiveling movement thereabout. The clip may even be used on a flexible member having a cylindrical surface portion, e.g., a clothesline.

As can be seen in FIG. 1 the hanger 20 basically comprises a body portion 22 and hook means 24 connected thereto for supporting or suspending the body portion from a support (not shown). The hook 24, as will be described in detail later, is connected to the body portion so that they can be swiveled freely through an angle of 360° with respect to each other.

In accordance with the preferred aspect of the instant invention, the entire hanger 20 is substantially cylindrical in cross-section (see FIG. 3) to provide an aesthetically pleasing, modern, tubular appearance which is now highly desired by the consuming public.

The body portion 22 basically comprises an upstanding neck or stem portion 26, a pair of arms 28, and a cross-bar 30. The arms 28 are connected together at the stem 26 and diverge downward and outward therefrom. Each arm 28 is joined to a respective end of the cross-bar 30 at a rounded shoulder 32.

As is conventional, the diverging arms 28 serve as a means for supporting a jacket or other similarly constructed garment on the hanger. In order to support dresses or other garments having straps, each arm 28 includes a slot 34 disposed parallel to the arm itself and having a narrow mouth 36. Each slot is formed by a pair of downward extensions 38 and a cross-piece 40. A small hook 42 projects outward from the extension 38 which is immediately adjacent the shoulder 32. The hook 42 serves as a convenient means for holding the straps of delicate garments. The cross-sectional area of the body portion 20 of the hanger is cylindrical throughout its entire length except for the portion forming the hook 42, which portion is, while also cylindrical, is of substantially smaller cross-sectional area and diameter.

The body portion 22 is molded as an integral unit of a low cost plastic which is strong, lightweight, and durable, such as polypropylene.

As can be seen in FIG. 1, the suspender hook 24 includes an arcuate upper portion 44, an intermediate portion 46 and a connecting portion 48. The connecting portion 48 is arranged to connect the hook 24 to the body 22 to enable the body to be supported by the hook, yet be swiveled freely about the longitudinal axis 50 of the stem 26.

Turning to FIG. 2, it can be seen that the connecting portion 48 includes a socket 52 located therein. The socket 52 is in the form of a cylindrical bore which is coaxial with the axis 50 and includes a peripheral collar 54 projecting radially inward toward the axis 50. The collar 54 merges with the remaining portion of the socket via a pair of tapered surfaces 56. The stem portion 26 of the body of the hanger includes a smaller diameter shaft 58 extending coaxially with the axis 50. The shaft 58 includes an annular recess 60 about its periphery and which mates with the collar 54. The outside diameter of the shaft 58 is just slightly smaller than the inside diameter of the socket so that the shaft 58 can be snap-fit within the socket and with the peripheral collar 54 being located within the annular recess 60. Like the body portion 20, the hook 24 is also formed as an integral unit of a plastic, and is preferably the same plastic as that of the body portion. The use of a somewhat resilient plastic, such as polypropylene, enables the shaft to be readily inserted and snap-fit within the socket, thus facilitating the assembly of the hanger.

When the shaft 58 is snap-fit within the socket 52, the hook and body can be freely swiveled manually with respect to each other through the full 360° about axis 50, yet there is sufficient frictional engagement to prevent accidental swiveling.

Referring now to FIGS. 3–5, there is shown the details of the clip 200. As can be seen, the clip 200 basically comprises a pair of jaws 202 and resilient bias means 204 for connecting the jaws to one another. Each of the jaws is formed of a plastic masterial which is low in cost, lightweight, durable and resilient. The biasing means 204 is also formed of a plastic material but which preferably exhibits a higher tensile strength and resiliency than the material forming the jaws 202. In accordance with a preferred embodiment of the clip, the jaws 202 are formed of polypropylene, like the hanger 20 described heretofore, while the resilient means 204 comprises polycarbonate, such as sold under the General Electric Company Trademark "LEXAN".

As can be seen in FIGS. 4 and 5, each jaw 202 is formed as a substantially planar loop and includes an enlarged first end portion 206, an intermediate portion 208 and a narrow second end portion 210. The jaws 202 are arranged to be disposed side-by-side, with a rod-like element, such as crossbar 30, forming a fulcrum therebetween, and with the bias means 204 encircling a portion of the opposed jaws and rod-like element to hold the clip together. The opposed end portions 210 form a mouth for the clip which can be opened to receive a garment. The mouth is opened by grasping the clip by its end portions 206 and squeezing those portions toward each other against the bias force of bias means 204. Upon release of the portions 206, the bias means 204 pivots the jaws back together to effect the holding of a garment tightly between the opposed jaw ends 210.

The precise details of the clip 200 and the manner of assembly and disassembly thereof, will now be described. To that end, as can be seen in FIG. 5, the enlarged end portion 206 of each jaw is of generally ring-like construction and includes a central opening 212. The central opening is suitably dimensioned to enable a user's fingers to be comfortably received therein, but not extend therethrough, so that the jaws can be grasped comfortably to facilitate the opening of the clip. The second end portion 210 of each jaw is generally linear and includes a semi-cylindrical free end projection 214 projecting inward normally therefrom. The opposed free end projections 214 each include a plurality of ridges 216 extending across the full width thereof and are adapted to be the portions of the clip which actually engage the garment to securely hold the garment therebetween under the bias force provided by the bias means 204. The ridges increase frictional engagement between the clip and the garment.

The intermediate portion 208 of each jaw includes a wedge portion 218 projecting inward, i.e., in the same direction as the projection 214. The wedge portion 218 includes an arcuate recess 220 which is suitably configured to receive a portion of the periphery of the cross-bar 30 or any other element having a circular surface.

The outside of the intermediate portion of each jaw includes an inclined or ramp surface portion 222 extending downwardly from the edge of the arcuate recess 220 to a planar surface 224 of the end 210. A locking slot or recess 26 is located on the outside of the jaw on the planar surface portion 224. Each locking recesses 226 is adapted to receive a respective end of the bias means 204 to secure the two jaws and the bias means to each other on the element 30.

The resilient bias means 204 is of generally U-shape having a pair of outwardly flaring legs 228 and an arcuate mid-portion 230. Each of the legs termiantes at its free end in an enlarged semi-circular projection 232 which is adpted to be received within a respective one of the slots 226 in the jaws 202.

The assembly of the clip 200 is as follows: The pair of jaws 202 are located opposite to each other on the cross-bar 30 of the hanger 20, or on any other suitably configured rod-like element, with the portion of the cross bar positioned within the opening formed by the respective arcuate recesses 220 in the opposed jaws. The U-shaped bias means 204 is then slipped about the cross-bar 30 so that the projections 232 engage the inclined surfaces 222 of the jaws. By pushing on the arcuate portion 230 of the resilient means 204 toward the jaw ends 210, the bias means slides toward those ends, with the portions 232 of the bias means riding up the inclined surfaces 222 until such portions reach the slots 226 in the planar portion 224. When this occurs, the projections 232 snap into the slots 226, thereby locking the bias means 204 in place and forming a central, circular shaped opening 234 (FIG. 4) in which the crossbar 30 is journalled. Once the clip components are secured, as just described, there is sufficient frictional engagement between the arcuate surfaces 220 and the periphery of the cross-bar 30 to insure that the clip can be readily slid therealong, when desired, but is resistant to accidental sliding. Moreover, the clip can be pivoted through an arc of 360° about the longitudinal axis of the cross-bar 30, since the cross-bar is journalled within opening 234 of the clip.

As can be seen in FIG. 5, the combined angular extent of the two arcuate recesses 220 is substantially less than 360° to enable the clip's mouth to be opened sufficiently wide to accommodate a wide variety of garments. The acruate mid-portion 230 of the clip prevents the jaws from falling off of the crossbar when the clip is fully closed.

If it is desired to remove the clip 200 from the cross-bar 30, all that is required is to grasp the legs 228 of the resilient means 204 to extract the projections 232 from the recesses 226, whereupon the clip can be retracted by pulling its mid-portion 230 away from the mouth of the clip. Such action is facilitated by the inclined surfaces 222 which serve as downwardly extending ramps for the bias member 204 as it is retracted.

As will be appreciated from the foregoing, the hanger 20 and the clip 200 of the instant invention each are simple in construction, can be made at low cost, can be readily assembled and disassembled, and provide the aesthetically pleasing tubular appearance so highly desired in the market place at present.

Without further elaboration the foregoing will so fully illustrate our invention that others may, by applying current or future knowledge, readily adapt the same for use under various conditions of service.

We claim:

1. A clip arranged for ready assembly and releasable securement on a rod-like element of a first predetermined diameter and having a longitudinal axis, said clip comprising a pair of jaws formed of a first plastic material and resilient bias means formed of polycarbonate and having higher tensile strength and resiliency than said first material, each of said jaws being a generally planar member and comprising an elongated first end portion defining a finger grasping opening, an intermediate portion, and a second end portion including a projection extending at an angle to the plane of said jaw member, said intermediate portion including an arcuate recess therein for close receipt of a portion of the periphery of said rod-like element when said clip is assembled thereon, said bias means being a generally U-shaped member having a pair of outwardly flared legs each terminating in a free end and an arcuate intermediate portion defining a recess having a first predetermined diameter, the free ends of said bias means being spaced apart by a distance greater than the diameter of said recess to enable said bias means to be readily secured to said jaws, with each of said legs overlying and engaging a respective one of said jaws adjacent said intermediate portion and with the recess in said arcuate portion coacting with the recess in each of said jaws to form a substantially circular opening closely receiving a portion of said rod-like member therein to complete the assembly of said clip by holding said jaws on said rod-like member and whereupon said clip can be readily slid therealong and pivoted thereabout with said rod-like element acting as a fulcrum.

2. The clip of claim 1 wherein said intermediate portion includes an inclined surface terminating in a locking recess and wherein each leg of said bias means includes an enlarged free end which is arranged to slide along said surface and into said recess to facilitate the assembly of said clip.

3. The clip of claim 1 wherein each of said jaws is in the form of a planar loop.

4. The clip of claim 1 wherein said first plastic material is polypropylene.

5. The clip of claim 4 wherein said rod-lik element comprises a portion of a garment hanger.

6. The clip of claim 5 wherein said rod-like element is formed of polypropylene.

*7. A clip arranged for ready assembly on a rod-like element of a first predetermined diameter, said clip comprising a pair of jaws formed of a first plastic material and resilient bias means formed of a second plastic material having a higher tensile strength and greater resiliency than said first plastic material, each of said jaws including a generally planar member comprising a first end portion, an intermediate portion, and a second end portion including a projection extending at an angle to the plane of said planar member, said intermediate portion having an outer inclined surface, and said first end portions being movable relative to each other by a user for moving said second end portions relative to each other from a normally closed position to an opened position, said resilient bias means, in an unbiased state thereof, being a generally U-shaped member having a pair of outwardly flared legs each terminating in a free end and an arcuate intermediate portion defining a recess having a first predetermined diameter, the*

*free ends of said bias means being spaced apart by a distance greater than the diameter of said recess, said spaced-apart distance permitting the free ends of the bias means in said unbiased state to engage the inclined outer surfaces of the intermediate portions of the jaws to enable said bias means to be readily manually secured in a biased state to said jaws by sliding said legs along said inclined surfaces into said biased state, each of said legs overlying and engaging a respective one of said jaws adjacent said intermediate portion for holding said jaws together and biasing said second end portions into said normally closed position, said intermediate portion of each of the jaws also including an arcuate recess therein for closely receiving a portion of the periphery of said rod-like element when said resilient bias means is assembled with said jaws, the recess defined by the arcuate intermediate portion of said bias means coacting with the recesses in the intermediate portions of the jaws to form an arcuate opening closely receiving a portion of said rod-like element therein, said first end portions and said second end portions of said jaws being movable relative to each other on an outer peripheral surface of said rod-like element.*

*8. The clip of claim 7 characterized in that said inclined surface of each jaw terminates in a locking recess and wherein each leg of said bias means includes an enlarged free end which is arranged to slide along said surface and into said locking recess to facilitate the assembly of said clip.*

* * * * *